United States Patent
Jaffrennou et al.

(10) Patent No.: US 9,938,184 B2
(45) Date of Patent: *Apr. 10, 2018

(54) SIZING COMPOSITION FOR FIBERS, IN PARTICULAR MINERAL FIBERS, COMPRISING A NON-REDUCING SUGAR AND AN INORGANIC ACID AMMONIUM SALT, AND RESULTING PRODUCTS

(71) Applicant: SAINT-GOBAIN ISOVER, Courbevoie (FR)

(72) Inventors: Boris Jaffrennou, Paris (FR); Edouard Obert, Coye-la-Foret (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,857

(22) Filed: Feb. 5, 2016

(65) Prior Publication Data
US 2016/0264454 A1    Sep. 15, 2016

Related U.S. Application Data

(63) Continuation of application No. 13/378,587, filed as application No. PCT/FR2011/052802 on Nov. 29, 2011, now Pat. No. 9,255,215.

(30) Foreign Application Priority Data

Nov. 30, 2010 (FR) ..................... 10 59898

(51) Int. Cl.
*C03C 13/06* (2006.01)
*C03C 25/32* (2018.01)
(Continued)

(52) U.S. Cl.
CPC ............. *C03C 13/06* (2013.01); *C03C 25/32* (2013.01); *C09J 11/00* (2013.01); *D04H 1/425* (2013.01);
(Continued)

(58) Field of Classification Search
CPC . C09J 11/00; C03C 25/32; C08K 3/24; D04H 1/4209; D04H 1/4218; D04H 1/425;
(Continued)

(56) References Cited

U.S. PATENT DOCUMENTS 2,875,073 A    2/1959  Gogek
3,664,855 A    5/1972  Morrison et al.
(Continued)

FOREIGN PATENT DOCUMENTS

WO    WO 2007/014236    2/2007
WO    WO 2009/019232    2/2009
(Continued)

*Primary Examiner* — Jeremy R Pierce
(74) *Attorney, Agent, or Firm* — Pillsbury Winthrop Shaw Pittman LLP

(57) ABSTRACT

A formaldehyde-free sizing composition for products based on fibers, in particular mineral fibers, such as fibers of glass or of rock, includes at least one non-reducing sugar, and at least one inorganic acid ammonium salt, preferably chosen from ammonium sulfates, phosphates, nitrates and carbonates. Another subject matter of the present invention is the products thus obtained, in particular thermal and/or acoustic insulators based on mineral wool and veils of nonwoven mineral fibers, and their process of manufacture.

24 Claims, 1 Drawing Sheet

(51) Int. Cl.

| | | |
|---|---|---|
| *C09J 11/00* | (2006.01) | |
| *D04H 1/4209* | (2012.01) | |
| *D04H 1/4218* | (2012.01) | |
| *D04H 1/425* | (2012.01) | |
| *D04H 1/4282* | (2012.01) | |
| *D04H 1/435* | (2012.01) | |
| *D04H 1/587* | (2012.01) | |
| *D04H 1/64* | (2012.01) | |
| *E04B 1/76* | (2006.01) | |
| *D06M 11/58* | (2006.01) | |
| *D06M 13/148* | (2006.01) | |
| *F16L 59/02* | (2006.01) | |
| *G10K 11/162* | (2006.01) | |
| *C08K 3/24* | (2006.01) | |

(52) U.S. Cl.
CPC ......... *D04H 1/4209* (2013.01); *D04H 1/4218* (2013.01); *D04H 1/4282* (2013.01); *D04H 1/435* (2013.01); *D04H 1/587* (2013.01); *D04H 1/64* (2013.01); *D06M 11/58* (2013.01); *D06M 13/148* (2013.01); *E04B 1/7662* (2013.01); *F16L 59/028* (2013.01); *G10K 11/162* (2013.01); *C03C 2217/29* (2013.01); *C08K 3/24* (2013.01); *Y10T 428/249921* (2015.04)

(58) Field of Classification Search
CPC ...... D04H 1/4282; D04H 1/435; D04H 1/587; D04H 1/64; E04B 1/7662; Y10T 428/249921

See application file for complete search history.

(56) References Cited

U.S. PATENT DOCUMENTS

| | | |
|---|---|---|
| 5,318,990 A | 6/1994 | Strauss |
| 5,340,868 A | 8/1994 | Strauss et al. |
| 5,661,213 A | 8/1997 | Arkens et al. |
| 5,895,804 A | 4/1999 | Lee et al. |
| 5,932,689 A | 8/1999 | Arkens et al. |
| 5,977,232 A | 11/1999 | Arkens et al. |
| 6,071,994 A | 6/2000 | Hummerich et al. |
| 6,099,773 A | 8/2000 | Reck et al. |
| 6,146,746 A | 11/2000 | Reck et al. |
| 6,299,936 B1 | 10/2001 | Reck et al. |
| 6,331,350 B1 | 12/2001 | Taylor et al. |
| 9,255,215 B2 * | 2/2016 | Jaffrennou ............... C03C 25/32 |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |
| 2010/0031619 A1 | 2/2010 | Grove et al. |
| 2010/0222463 A1 | 9/2010 | Brady et al. |

FOREIGN PATENT DOCUMENTS

| | | |
|---|---|---|
| WO | WO 2009/019235 | 2/2009 |
| WO | WO 2009/080938 | 7/2009 |

* cited by examiner

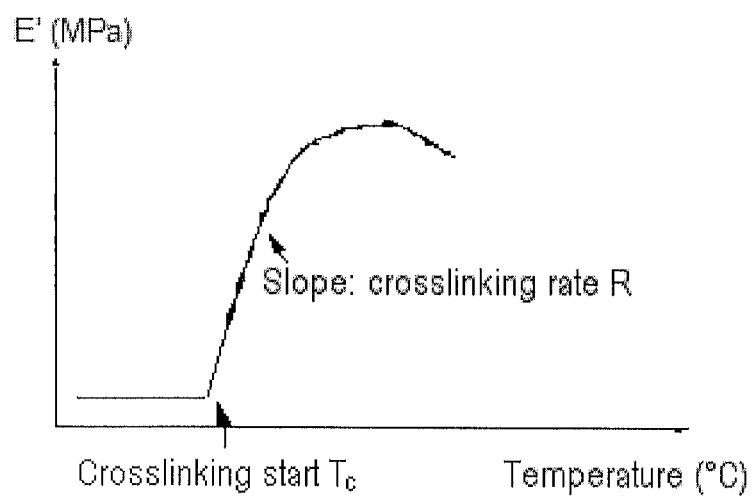

SIZING COMPOSITION FOR FIBERS, IN PARTICULAR MINERAL FIBERS, COMPRISING A NON-REDUCING SUGAR AND AN INORGANIC ACID AMMONIUM SALT, AND RESULTING PRODUCTS

CROSS-REFERENCE TO RELATED APPLICATIONS

This application is a continuation of U.S. application Ser. No. 13/378,587, filed on Dec. 15, 2011, which is the U.S. National Stage of PCT/FR2011/052802, filed Nov. 29, 2011, which in turn claims priority to French Patent Application No. 1059898, filed Nov. 30, 2010, the entire contents of all applications are incorporated herein by reference in their entireties.

FIELD

The present invention relates to the field of products based on fibers, in particular mineral fibers, bonded by a formaldehyde-free binder.

More particularly, the invention relates to thermal and/or acoustic insulating products in which the fibers are in the form of mineral wool, in particular of glass or of rock.

BACKGROUND

The manufacture of insulating products based on mineral wool generally comprises a stage of manufacture of the wool itself, which can be carried out by various processes, for example according to the known technique of fiberizing by internal or external centrifugation.

Internal centrifugation consists in introducing the molten material (generally glass or a rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form a web of fibers (or mineral wool).

External centrifugation consists, for its part, in pouring out the molten material at the external peripheral surface of rotating members, known as rotors, from where said material is ejected under the action of the centrifugal force. Means for drawing by gas stream and for collecting on a receiving member are also provided.

In order to provide for the assembly of the fibers together and to make it possible for the web to have cohesion, a sizing composition comprising a thermosetting resin is applied to the fibers, on the route between the outlet of the centrifugal device and the receiving member. The web of fibers coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibers, in particular glass fibers, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea, in its turn at least partially decomposed to give ammonia, which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known.

A first solution is based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Other sizing compositions have been provided which comprise a polycarboxylic polymer, a polyol and a catalyst, this catalyst being able to be a phosphorus-comprising compound (U.S. Pat. Nos. 5,318,990, 5,661,213, 6,331,350, US 2003/0008978), a fluoroborate (U.S. Pat. No. 5,977,232) or else a cyanamide, a dicyanamide or a cyanoguanidine (U.S. Pat. No. 5,932,689).

The sizing compositions based on a polycarboxylic polymer and on a polyol can additionally comprise a cationic, amphoteric or nonionic surfactant (US 2002/0188055), a coupling agent of silane type (US 2004/0002567) or a dextrin as cobinder (US 2005/0215153).

A description has also been given of sizing compositions comprising an alkanolamine including at least two hydroxyl groups and a polycarboxylic polymer (U.S. Pat. No. 6,071,994, 6,099,773, 6,146,746) in combination with a copolymer (U.S. Pat. No. 6,299,936).

A second solution in which resols are replaced is based on the combination of a saccharide and a polycarboxylic acid.

In U.S. Pat. No. 5,895,804, a description is given of an adhesive composition based on heat-crosslinkable polysaccharides which can be used as size for mineral wool. The combination includes a polycarboxylic polymer having at least two carboxylic acid functional groups and a molecular weight at least equal to 1000, and a polysaccharide having a molecular weight at least equal to 10 000.

In WO 2009/080938, the sizing composition comprises a monosaccharide and/or a polysaccharide and an organic polycarboxylic acid with a molar mass of less than 1000.

A formaldehyde-free aqueous sizing composition which comprises a Maillard reaction product, in particular combining a reducing sugar, a carboxylic acid and ammonia (WO 2007/014236), is also known. In WO 2009/019232 and WO 2009/019235, the proposal is made to substitute, for the carboxylic acid, an acid precursor derived from an inorganic salt, in particular an ammonium salt, which exhibits the additional advantage of being able to replace all or part of the ammonia.

SUMMARY

There exists a need for formaldehyde-free sizing compositions which make it possible to manufacture products based on fibers, in particular mineral fibers, exhibiting good resistance to aging, in particular in a humid environment.

An aim of the present invention is to provide a sizing composition for fibers, in particular mineral fibers, more particularly of glass or of rock, which overcomes the abovementioned disadvantages.

A subject matter of the invention is thus a sizing composition capable of crosslinking to form a binder, which includes at least one non-reducing sugar and at least one inorganic acid ammonium salt, to the process for the manufacture of thermal and/or acoustic insulating products and to the products which result therefrom.

The sizing composition in accordance with the invention comprises:
at least one non-reducing sugar, and
at least one inorganic acid ammonium salt.

BRIEF DESCRIPTION OF THE DRAWING

FIG. 1 shows a curve of variation in the modulus of elasticity E' (in MPa) as a function of the temperature (in ° C.).

DETAILED DESCRIPTION

The expression "non-reducing sugar" should be understood in the conventional sense, namely that it relates to a sugar composed of several saccharide units, the carbon 1 of which carrying the hemiacetal OH group is the participant in a bond.

The non-reducing sugar in accordance with the present invention is a non-reducing oligosaccharide including at most 10 saccharide units.

Mention may be made, as examples of such non-reducing sugars, of disaccharides, such as trehalose, isotrehaloses, sucrose and isosucroses, trisaccharides, such as melezitose, gentianose, raffinose, erlose and umbelliferose, tetrasaccharides, such as stachyose, and pentasaccharides, such as verbascose.

Preference is given to sucrose and trehalose and better still to sucrose.

The inorganic acid ammonium salt reacts with the non-reducing sugar under the effect of the heat to form a polymeric network constituting the final binder. The polymeric network thus formed makes it possible to establish bonds between the mineral fibers, in particular at the junction points of the fibers in mineral wool, which confers, on the final product, a certain "elasticity" capable of providing good thickness recovery after the product has been unpacked.

The inorganic acid ammonium salt is chosen from ammonium sulfates, in particular ammonium hydrogensulfate $NH_4HSO_4$ and ammonium sulfate $(NH_4)_2SO_4$, ammonium phosphates, in particular monoammonium phosphate $NH_4H_2PO_4$, diammonium phosphate $(NH_4)_2HPO_4$ and ammonium phosphate $(NH_4)_3PO_4$, ammonium nitrates and ammonium carbonates, in particular ammonium bicarbonate $NH_4HCO_3$ and ammonium carbonate $(NH_4)_2CO_3$.

The inorganic acid ammonium salt is preferably chosen from sulfates and phosphates, advantageously sulfates.

In the sizing composition, the inorganic acid ammonium salt represents from 1 to 30% by weight of the total weight of the mixture composed of the non-reducing sugar and the inorganic acid ammonium salt, preferably from 3 to 20% and advantageously from 5 to 15%.

The sizing composition does not comprise any organic polycarboxylic acid with a molar mass of less than 1000, and is generally totally devoid of organic polycarboxylic acid.

The sizing composition can comprise, in addition to the compounds mentioned, the conventional additives below in the following proportions, calculated on the basis of 100 parts by weight of non-reducing sugar and of inorganic acid ammonium salt:
from 0 to 2 parts of silane, in particular an aminosilane,
from 0 to 20 parts of oil, preferably from 4 to 15 parts,
from 0 to 20 parts of glycerol, preferably from 0 to 10 parts,
from 0 to 5 parts of a silicone,
from 0 to 30 parts of an "extender".

The role of the additives is known and is briefly restated: the silane is an agent for coupling between the fibers and the binder, and also acts as antiaging agent; the oils are dust-preventing and hydrophobic agents; the glycerol acts as plasticizer and makes it possible to prevent pregelling of the sizing composition; the silicone is a hydrophobic agent having the role of reducing the absorption of water by the insulating product; the "extender" is an organic or inorganic filler, soluble or dispersible in the sizing composition, which makes it possible in particular to reduce the cost of the sizing composition.

The sizing composition exhibits a pH which varies according to the nature of the inorganic acid ammonium salt used, generally from 6 to 9, advantageously from 7 to 8.

The sizing composition according to the invention is intended to be applied to fibers which can be mineral or organic, or else to a mixture of mineral and organic fibers.

As already indicated, the mineral fibers can be glass fibers, in particular of E, C, R or AR (alkali-resistant) glass, or rock fibers, in particular basalt (or wollastonite). These fibers can also be fibers including more than 96% by weight of silica and ceramic fibers based on at least one oxide, nitride or carbide of metal or semimetal, or on a mixture of these compounds, in particular on at least one oxide, nitride or carbide of aluminum, zirconium, titanium, boron or yttrium.

The organic fibers can be synthetic fibers or natural fibers.

Mention may be made, as examples of synthetic fibers, of fibers based on an olefin, such as polyethylene and polypropylene, on a polyalkylene terephthalate, such as polyethylene terephthalate, or on a polyester.

Mention may be made, as examples of natural fibers, of plant fibers, in particular fibers of wood, cellulose, cotton, coconut, sisal, hemp or flax, and animal fibers, in particular wool.

As already mentioned, the sizing composition is more particularly used as sizing composition for thermal and/or acoustic insulating products based on mineral wool.

Conventionally, the sizing composition is applied to the mineral fibers at the outlet of the fiber-forming device and before they are collected on the receiving member in the form of a web of fibers which is subsequently treated at a temperature which makes possible the crosslinking of the size and the formation of an infusible binder. The crosslinking of the size according to the invention takes place at a temperature of the order of from 100 to 200° C., generally at a temperature comparable to that of a conventional formaldehyde-phenol resin, in particular of greater than or equal to 110° C., preferably of less than or equal to 170° C.

The products based on fibers sized using the composition, in particular the acoustic and/or thermal insulating products obtained from these sized fibers, also constitute a subject matter of the present invention.

These products are generally provided in the form of a mat, a felt, panels, blocks, shells or other molded shapes based on mineral wool, of glass or of rock.

The sizing composition can also be used to manufacture coated or impregnated fabrics and veils (also known as "nonwovens"), in particular based on mineral fibers, such as glass or rock fibers.

Veils of mineral fibers are used in particular as surface coating for thermal and/or acoustic insulating products based on mineral wool or on a foam.

Another subject matter of the invention is a process for the manufacture of a thermal and/or acoustic insulating product based on mineral wool or of a veil of mineral fibers, according to which the mineral wool or the mineral fibers is/are manufactured, a composition according to the invention is applied to said wool or said fibers and said wool or said fibers is/are treated at a temperature which makes possible the crosslinking of the size and the formation of an infusible binder, for example under the thermal conditions described above.

The size can be applied by any appropriate means, for example by projection, spraying, atomization, coating or impregnation.

The following examples make it possible to illustrate the invention without, however, limiting it.

In these examples, the following are measured:
the crosslinking start temperature ($T_C$) and the crosslinking rate (R) by the Dynamic Mechanical Analysis (DMA) method, which makes it possible to characterize the viscoelastic behavior of a polymeric material. The procedure is as follows: a sample of Whatman paper is impregnated with the sizing composition (content of organic solids of the order of 40%) and is then fixed horizontally between two jaws. An oscillating component equipped with a device for measuring the stress as a function of the strain applied is positioned on the upper face of the sample. The device makes it possible to calculate the modulus of elasticity E'. The sample is heated to a temperature varying from 20 to 250° C. at the rate of 4° C./min. The curve of variation in the modulus of elasticity E' (in MPa) as a function of the temperature (in ° C.) is plotted from the measurements, the general appearance of the curve being given in FIG. 1. The temperature value, in ° C., for the start of crosslinking ($T_C$) and the slope corresponding to the crosslinking rate, in MPa/° C., are determined on the curve.

the viscosity, expressed in mPa·s, using a rheometer of plate/plate rotational type with shearing of 100 s$^{-1}$ at 25° C. The sample has a solids content of 30% by weight.

the contact angle of the sizing composition, comprising 30% by weight of solids, on a glass substrate.

the breaking stress of a veil sample of 5 cm×21 cm attached at one end to a tensile testing device and subjected to a continuous elongation of 40 mm/minute. The breaking stress is expressed in N/5 cm.

The breaking stress is measured after manufacturing (initial) and after the sample has been treated under accelerated aging conditions in water at 80° C. for 10 minutes. The result is expressed by the percentage of retention, which is equal to:

(breaking stress after treatment/initial breaking stress)×100.

the tensile strength according to the standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in newtons) of the sample is measured and the tensile strength TS, defined by the ratio of the breaking force F to the weight of the sample, is calculated.

The tensile strength is measured after manufacture (initial tensile strength) and after accelerated aging in an autoclave at a temperature of 105° C. under 100% relative humidity for 15 minutes (TS 15).

the initial thickness of the insulating product and the thickness after compressing for 1 hour and 24 hours with a degree of compression (defined as being the ratio of the nominal thickness to the thickness under compression) equal to 4.8/1. The thickness measurements make it possible to evaluate the good dimensional behavior of the product.

the thermal conductivity coefficient λ according to the standard EN 13162, expressed in W/(m×° K).

EXAMPLES 1 TO 20 a) A first series of sizing compositions is prepared, which compositions comprise the constituents appearing in table 1, expressed as parts by weight.

The sizing compositions are prepared by successively introducing, into a vessel containing water, the non-reducing or reducing sugar and the inorganic acid ammonium salt with stirring until the constituents have completely dissolved.

The sizing compositions of examples 1 and 4 exhibit a greater crosslinking rate than comparative examples 7 and 8 respectively.

Examples 1 to 6 exhibit low viscosity and contact angle values, comparable to comparative examples 7 and 8, which makes possible good application to mineral fibers, in particular by spraying.

b) A second series of sizing compositions is prepared, which compositions comprise the constituents appearing in table 2, expressed as parts by weight.

The sizing compositions are prepared under the conditions set out for the first series.

Test 1

A veil of glass fibers (Whatman GF/A, 50 g/m$^2$; sold by Whatman) is immersed in the sizing composition (13% of solid matter) for 2 minutes and then the excess size is removed by suction. The veil is subsequently treated in an oven at 200° C. for 135 seconds. In the end, the veil comprises 45% by weight of crosslinked binder. The values of the tensile strength and of the percentage of retention are given in table 2.

Test 2

A veil of glass fibers (Whatman GF/A, 50 g/m$^2$; sold by Whatman) is immersed in the sizing composition (13% of solid matter) for 2 minutes and then the excess size is removed by suction. The veil is subsequently treated in an oven at 200° C. for 5 minutes. In the end, the veil comprises 45% by weight of crosslinked binder.

The veil is immersed in water at 60° C. for 3 hours and is then dried in an oven at 60° C. for 1 hour. The portion of water-insoluble crosslinked binder remaining on the veil (as %) is measured by weighing before and after immersion in the water. The results appear in table 2.

Examples 3, 2 and 9, on the one hand, and 6 and 5, on the other hand, have a higher initial tensile strength than the corresponding comparative examples 11 to 14, and 17 and 18.

Examples 3, 2, 9 and 10, comprising ammonium sulfate, have a higher percentage of retention than comparative examples 11 to 14. Examples 15 and 16, comprising a higher proportion of diammonium sulfate, have a greater wet aging strength than comparative examples 19 and 20.

The proportion of binder remaining on the filter after treatment in the water is greater in the examples according to the invention (3, 2, 9 and 10, and 6, 5, 15 and 16) than in the respective comparative examples (11 to 14 and 17 to 20).

Tests 1 and 2 demonstrate that the sizing composition according to the invention has the capability of efficiently binding the fibers of a veil under conditions of accelerated aging in a humid environment. The application of the sizing composition is not limited to veils and can be extended to the other fibrous products mentioned above, in particular to fabrics and to products where the fibers are provided in the form of mineral wool for applications as thermal and/or acoustic insulating products.

EXAMPLES 21 AND 22

These examples illustrate the manufacture of insulating products on an industrial scale line.

Use is made of the sizing compositions of examples 1 and 7 (comparative), to which the following additives are added, per 100 parts by weight of sugar and ammonium sulfate: 1 part of γ-aminopropyltriethoxysilane and 8 parts of a mineral oil. These sizing compositions constitute examples 21 and 22 (comparative) respectively.

Glass wool is manufactured on a pilot scale line by the internal centrifugation technique in which the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

Conventionally, a size spraying ring is positioned beneath the fiberizing disk so as to uniformly distribute the sizing composition over the glass wool which has just been formed.

The mineral wool, thus sized, is collected on a belt conveyor with a width of 2.4 m equipped with internal extraction boxes which hold the mineral wool in the form of a web at the surface of the conveyor. The web passes continuously through an oven maintained at 270° C., where the constituents of the size polymerize to form a binder. The final insulating product has a nominal density of 17.5 kg/m$^3$.

The insulating products exhibit the following properties:

|  | Ex. 21 | Ex. 22 (comp.) |
| --- | --- | --- |
| Tensile strength (N) | | |
| initial | 4.5 | 4.2 |
| after aging (TS 15) | 4.3 | 3.8 |
| loss (%) | 4 | 10 |
| Thickness (mm) | | |
| after 1 hour | 106 | 102 |
| after 24 hours | 104 | 100 |
| Loss on ignition (%) | 6.0 | 6.0 |
| λ (W/(m × K)) | 0.035 | 0.035 |

The insulating product according to example 21 exhibits a higher initial tensile strength than that of comparative example 22. The tensile strength after aging of example 21 is also greater, the loss in tensile strength being 4% instead of 10% for comparative example 22.

In addition, the insulating product according to example 21 has an initial thickness which is slightly enhanced with respect to comparative example 22.

TABLE 1

| | Example | | | | | | | |
| --- | --- | --- | --- | --- | --- | --- | --- | --- |
| | 1 | 2 | 3 | 4 | 5 | 6 | 7 (Comp.) | 8 (Comp.) |
| Sizing composition | | | | | | | | |
| Sucrose | 85 | 90 | 95 | 85 | 90 | 95 | — | — |
| Glucose | — | — | — | — | — | — | 85 | 85 |

TABLE 1-continued

|  | Example | | | | | | | |
|---|---|---|---|---|---|---|---|---|
|  | 1 | 2 | 3 | 4 | 5 | 6 | 7 (Comp.) | 8 (Comp.) |
| Ammonium sulfate | 15 | 10 | 5 | — | — | — | 15 | — |
| Diammonium phosphate | — | — | — | 15 | 10 | 5 | — | 15 |
| Properties | | | | | | | | |
| Crosslinking start temp. $T_C$ (° C.) | 137 | 141 | 146 | 144 | 149 | 158 | 140 | 132 |
| Rate (R) (MPa/° C.) | 86.7 | 64.2 | 58.8 | 49.3 | 51.7 | 30.6 | 54.5 | 26.7 |
| Viscosity (mPa · s) | 5.4 | 5.5 | 5.4 | 5.4 | 5.5 | 5.5 | 5.4 | 5.4 |
| Contact angle (°) | 17 | 18 | 20 | 17 | 18 | 17 | 19 | 18 |
| pH[1] | 7.2 | 7.2 | 7.3 | 8.0 | 7.9 | 7.8 | 7.5 | 7.1 |

[1] solids content: 30%

TABLE 2

|  | Example | | | | | | | |
|---|---|---|---|---|---|---|---|---|
|  | 3 | 2 | 9 | 10 | 11 (Comp.) | 12 (Comp.) | 13 (Comp.) | 14 (Comp.) |
| Binder composition | | | | | | | | |
| Sucrose | 95 | 90 | 83 | 77 | — | — | — | — |
| Glucose | — | — | — | — | 95 | 90 | 83 | 77 |
| Ammonium sulfate | 5 | 10 | 17 | 23 | 5 | 10 | 17 | 23 |
| Diammonium phosphate | — | — | — | — | — | — | — | — |
| Properties | | | | | | | | |
| Tensile strength (N/cm) | | | | | | | | |
| initial | 104 | 120 | 130 | 109 | 100 | 96 | 111 | 115 |
| % retention | 22 | 46 | 65 | 66 | 9 | 30 | 52 | 61 |
| Insoluble portion (%) | 81.5 | 85.9 | 83.9 | 81.9 | 76.2 | 75.3 | 76.0 | 79.9 |

|  | Example | | | | | | | |
|---|---|---|---|---|---|---|---|---|
|  | 6 | 5 | 15 | 16 | 17 (Comp.) | 18 (Comp.) | 19 (Comp.) | 20 (Comp.) |
| Binder composition | | | | | | | | |
| Sucrose | 95 | 90 | 83 | 77 | — | — | — | — |
| Glucose | — | — | — | — | 95 | 90 | 83 | 77 |
| Ammonium sulfate | — | — | — | — | — | — | — | — |
| Diammonium phosphate | 5 | 10 | 17 | 23 | 5 | 10 | 17 | 23 |
| Properties | | | | | | | | |
| Tensile strength (N/cm) | | | | | | | | |
| initial | 83 | 120 | 99 | 120 | 65 | 99 | 118 | 131 |
| % retention | 11 | 53 | 86 | 68 | 10 | 53 | 58 | 53 |
| Insoluble portion (%) | 87.6 | 97.9 | 95.3 | 93.7 | 86.7 | 91.6 | 91.9 | 85.6 |

What is claimed is:

1. An aqueous formaldehyde-free sizing composition comprising:
   sucrose; and
   ammonium sulfate;
   wherein the ammonium sulfate is present in a range from 3% to 20% by weight of sucrose and ammonium sulfate; and
   further comprising one or more additives in an amount from
   0 to 2 parts of silane,
   4 to 15 parts of mineral oil,
   0 to 20 parts of glycerol,
   0 to 5 parts of a silicone, and
   0 to 30 parts of an extender,
   wherein the amount of each of the one or more additives is calculated on the basis of 100 parts by weight of sucrose and ammonium sulfate.

2. The composition of claimed 1, wherein the ammononium sulfate is present in a range from 5 to 15% by weight of sucrose and ammonium sulfate.

3. The composition of claim 1, wherein the one or more additives comprise from 0 to 10 parts of glycerol.

4. The composition of claim 1, wherein the sizing composition is devoid of organic polycarboxylic acid.

5. A product based on mineral fibers and/or organic fibers, the mineral fibers and/or organic fibers being sized using an aqueous formaldehyde-free sizing composition comprising:
   sucrose; and
   ammonium sulfate;
   wherein the ammonium sulfate is present in a range from 3% to 20% by weight of sucrose and ammonium sulfate.

6. The product of claim 5, wherein the product is a veil that includes mineral fibers.

7. The product of claim 5, wherein the product is an acoustic and/or thermal insulating product.

8. The product of claim 5, wherein the mineral fibers comprise glass wool or rock wool.

9. The product of claim 8, wherein the glass wool is made of E, C, R or AR (alkali-resistant) glass, and the rock wool is made from basalt, or the mineral fibers comprise more than 96% by weight of silica, or the mineral fibers are ceramic fibers based on at least one oxide, nitride, or carbide of a metal or a semimetal.

10. The product of claim 5, wherein the organic fibers are synthetic or natural fibers.

11. The product of claim 10, wherein the synthetic fibers are based on polyethylene or polypropylene.

12. The product of claim 5, wherein the sizing composition further comprises one or more additives in an amount from
    0 to 2 parts of silane,
    4 to 15 parts of mineral oil,
    0 to 20 parts of glycerol,
    0 to 5 parts of a silicone, and
    0 to 30 parts of an extender,
        wherein the amount of each of the one or more additives is calculated on the basis of 100 parts by weight of sucrose and ammonium sulfate.

13. The product of claim 12, wherein the one or more additives comprise from 0 to 10 parts of glycerol.

14. The product of claim 5, wherein the ammonium sulfate is present in a range from 5 to 15% by weight of sucrose and ammonium sulfate.

15. The product of claim 5, wherein the sizing composition is devoid of organic polycarboxylic acid.

16. A process for the manufacture of a product, according to which mineral fibers and/or organic fibers is manufactured, the process comprising
    applying a sizing composition to said mineral fibers and/or organic fibers; and
    treating said mineral fibers and/or organic fibers at a temperature which makes possible the crosslinking of the size and the formation of an infusible binder, wherein the sizing composition comprises an aqueous formaldehyde-free sizing comprising:
    sucrose; and
    ammonium sulfate;
        wherein the ammonium sulfate is present in a range from 3% to 20% by weight of sucrose and ammonium sulfate.

17. The process of claim 16, wherein the sizing composition further comprises one or more additives in an amount from
    0 to 2 parts of silane,
    4 to 15 parts of mineral oil,
    0 to 20 parts of glycerol,
    0 to 5 parts of a silicone, and
    0 to 30 parts of an extender,
        wherein the amount of each of the one or more additives is calculated on the basis of 100 parts by weight of sucrose and ammonium sulfate.

18. The process of claim 17, wherein the one or more additives comprise from 0 to 10 parts of glycerol.

19. The process of claim 16, wherein the mineral fibers comprise glass wool or rock wool.

20. The process of claim 19, wherein the glass wool is made of E, C, R or AR (alkali-resistant) glass, and the rock wool is made of basalt fibers including more than 96% by weight of silica.

21. The process of claim 16, wherein the ammonium sulfate is present in a range from 5 to 15% by weight of sucrose and ammonium sulfate.

22. The process of claim 16, wherein the sizing composition is devoid of organic polycarboxylic acid.

23. The process of claim 16, wherein the product is an acoustic and/or thermal insulating product.

24. The process of claim 6, wherein the product is a veil that includes mineral fibers.

* * * * *